United States Patent [19]

Armstrong

[11] 3,720,036
[45] March 13, 1973

[54] METHOD FOR AUTOMATICALLY ATTACHING A HANDLE TO BAGS

[75] Inventor: William A. Armstrong, Brookpark, Ohio

[73] Assignee: The Dow Chemical Company, Midland, Mich.

[22] Filed: Dec. 21, 1970

[21] Appl. No.: 99,781

[52] U.S. Cl. ............................53/14, 53/37, 53/134, 93/35 H
[51] Int. Cl. ..............................................B65b 61/14
[58] Field of Search..93/DIG. 1, 8 WA, 35 DS, 35 H, 93/35 PC; 53/29, 30, 37, 184, 14

[56] References Cited

UNITED STATES PATENTS

| | | | |
|---|---|---|---|
| 3,156,206 | 11/1964 | Hall | 93/35 H |
| 3,348,361 | 10/1967 | Shazor | 53/184 |
| 3,548,723 | 12/1970 | Sengewald | 93/35 H |
| 3,540,179 | 11/1970 | Watts | 53/30 |
| 3,190,050 | 6/1965 | Kirkpatrick | 53/30 |
| 3,386,837 | 6/1968 | Arnot | 93/35 H |
| 3,497,059 | 2/1970 | Watts | 53/30 X |

Primary Examiner—Travis S. McGehee
Attorney—Gustalo Nunez

[57] ABSTRACT

Method and apparatus for affixing a stiffening member such as a wooden or plastic rod across the top end of a filled or unfilled bag element to provide a handle therefor that uniformly distributes the carrying load across the width of the bag. In one form of the invention, for example, a plastic bag and a rod of discreet length are moved together through a folding tunnel where the top portion of the bag is automatically folded over to encapsulate the rod. The folded over portion is then secured circumferentially about the rod by heat welding. A second weld is formed beneath the first weld, and hand or finger-size cutouts are punched or otherwise located in the region between the two welds. The cutouts cooperatively with the rod form a carrying handle of the above-noted quality. A step of strategically heating the film to tightly shrink the same about the encapsulated rod is additionally disclosed.

5 Claims, 8 Drawing Figures

PATENTED MAR 13 1973 3,720,036

INVENTOR.
William A. Armstrong
BY
Burke M. Halldorson
ATTORNEY

INVENTOR.
William A. Armstrong

METHOD FOR AUTOMATICALLY ATTACHING A HANDLE TO BAGS

DESCRIPTION OF THE INVENTION

Plastic bags are increasingly finding usage in the packaging of fertilizers, salt, various lawn supplies, feeds, and the like. Distribution of such products ordinarily call for the packaging of product lots in a range varying from about 5 to 50 pounds and sometimes up to 100 pounds. Since such products are sold retail, it is usually desired that a carrying handle of some sort be provided at the top end of the bag.

Currently there are various ways in which a handle can be fabricated in large size plastic bags. For example, the bag can be folded over or gusseted across its top end. The gusseted or fold over area thus comprises four-ply or, in other words, a reinforced area for receiving the handle. The actual handle is usually formed by punching finger or hand-size cutouts through the four plies of material to provide suitable grasping means for carrying the bag.

Such a handle while conveniently formed and therefore inexpensive, concentrates the carrying load at regions immediately adjacent the cutout area. The ideal situation would be where a stiffening member or the like could be attached across the top end of the bag to evenly distribute the load, rather than having the carrying load concentrated in one area of the bag. Such a handle would improve the ease with which the bag could be carried, and increase the overall strength of the handle.

Even so, the usage of such a handle is normally more costly and therefore not as satisfactory for bags of a type to be discarded after a single use. The difficulty and expense in providing such a handle is principally in the additional steps required to attach the handle to the bag. For large scale commercial packagers, for example, such a handle could be economically used only if some way of automatically and conveniently attaching it to the bag is provided.

Accordingly, it is among the objects of the present invention to provide the following:

Method and apparatus for automatically attaching a stiffening member, such as a wooden or plastic rod, to the top end of a bag to provide a carrying handle therefor of improved strength and load distributing qualities.

Such method and apparatus wherein the handle can be attached conveniently and with minimum additional fabricating costs; and Such method and apparatus wherein the handle or stiffening member is automatically attached to the bag after it is filled, and as an integral part of the closure step, to secure the product fill within the bag.

BRIEF SUMMARY OF THE INVENTION

Briefly then, the present invention resides in unique methods and apparatus for attaching carrying handles to plastic bags, the handle being generally the type comprising a stiffening member such as a wooden or plastic rod. In practicing the invention a plastic bag and a rod of discreet length are simultaneously moved through a folding tunnel where the top portion of the bag is gradually folded over to encapsulate the rod. As the bag and encapsulated rod emerge from the folding tunnel, heat is applied along a strip adjacent the lower edge of the rod to secure the folded over portion circumferentially thereabout by heat welding. The application of heat can simultaneously serve to tightly shrink the film against the rod. Either way, once the rod is affixed together with the bag, several handle constructions are possible and may be automatically effected. For example, a second weld can be conveniently formed beneath the first weld and hand or finger-size cutouts made or pre-made in the film in the region between the spaced apart welds. The cutouts in combination with the encapsulated rod form a carrying handle admirably suited for use with large size plastic bags. The invention discloses that a continuous length of material, such as a plastic ribbon, can be continuously attached in a like manner, this latter embodiment of the invention being particularly applicable for bags connected together in chain form.

DESCRIPTION OF THE DRAWINGS

The preferred embodiment of the present invention is shown in the accompanying drawings wherein, wheresoever possible, like reference numerals designate corresponding materials and parts throughout the several views thereof in which.

Figure 1:
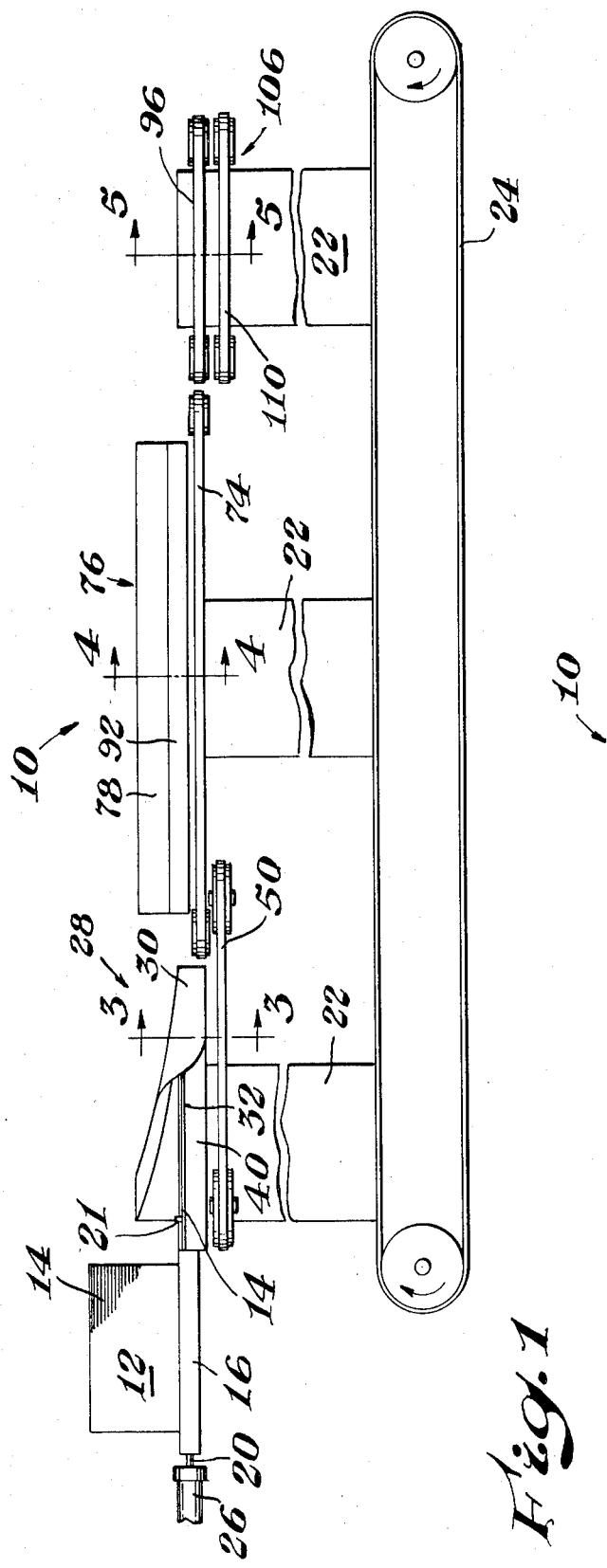
FIG. 1 is a side elevational view schematically illustrating apparatus for accomplishing the objectives of the present invention.
Figure 6:
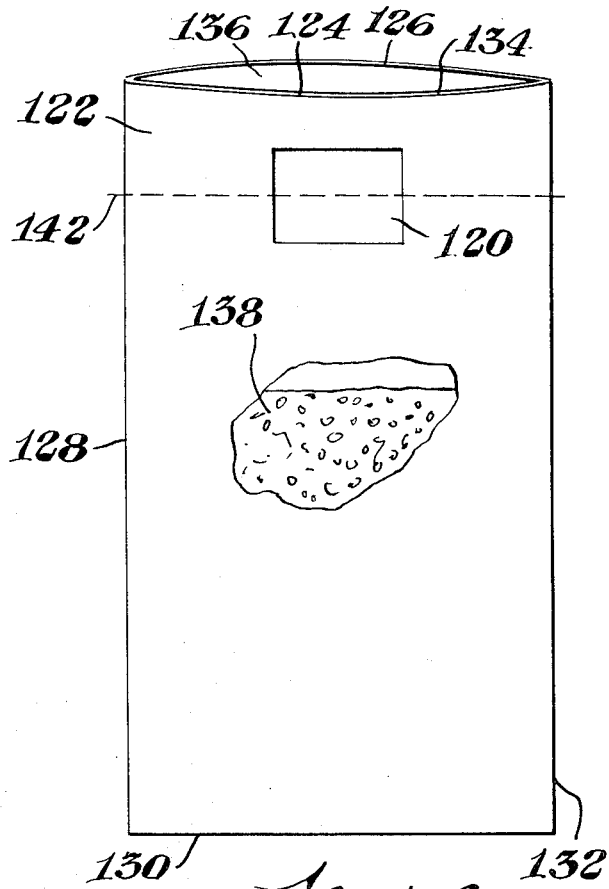
Figure 7:
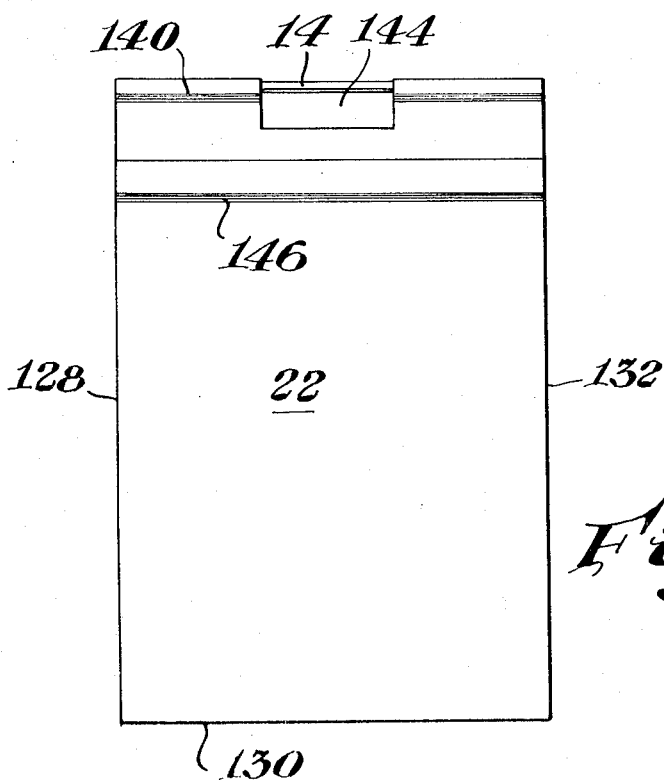
Figure 8:
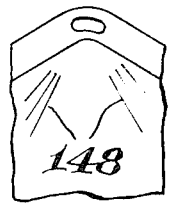

FIG.. 3–5 are enlarged cross-sectional views of the apparatus of FIG. 1 taken along reference lines 3—3, 4—4, and 5—5, respectively, thereof, and show in somewhat more detail the construction of such apparatus;

FIGS. 6–7 are side elevational views showing a bag before and after attaching the handle thereto; and FIG. 8 is a side elevational view of a bag incorporating a prior art handle structure, and is shown for comparative purposes only.

DISCUSSION OF THE PREFERRED EMBODIMENT

In practicing the method of the present invention, a load distributing handle comprising a stiffening member, such as a rod of discreet length can be conveniently attached to an advancing or moving bag either before or after the bag is filled. Ordinarily, in the former procedure, the handle would be attached to one end of the bag, the bag then inverted and filled and sealed closed at its opposite end; that is, the bag ordinarily would be later filled through with what would ultimately be referenced as the bottom end of the bag.

The most advantageous form of the invention, however, contemplates automatically attaching the handle or stiffening member to the bag after it is filled, and as an integral part of the closure step to secure the product fill within the bag.

Referring now to FIGS. 1 through 5, an embodiment individually apparatus 10 for accomplishing this end is illustrated as comprising a dispensing magazine 12 containing a plurality of stiffening members such as rods 14 of, for example, plastic, metal, paper, or like relatively stiff material. A horizontal trough 16, including a central continuous channel portion 18, is positioned cooperatively with magazine 12 for receiving rods 14 as they are dropped or otherwise dispensed individually from the magazine (see FIG. 2). A plunger 20, including an enlarged pushing head 21 at the forwardmost extent thereof, is reversely movable in channel portion 18 for repeatedly forwarding rods 14 as they are individually dispensed into the trough, and in timed relationship with the bottom movement of bags 22 supported therebelow on a movable bottom conveyor means 24. Plunger 20 can be operated, for example, by suitable air cylinder means or the like as denoted generally at 26.

Figure 3:
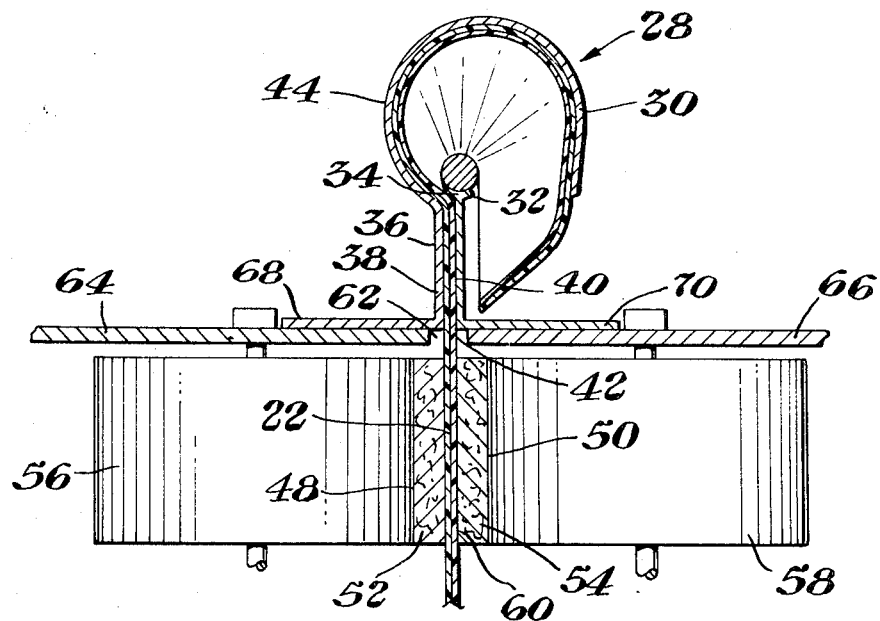
Figure 4:
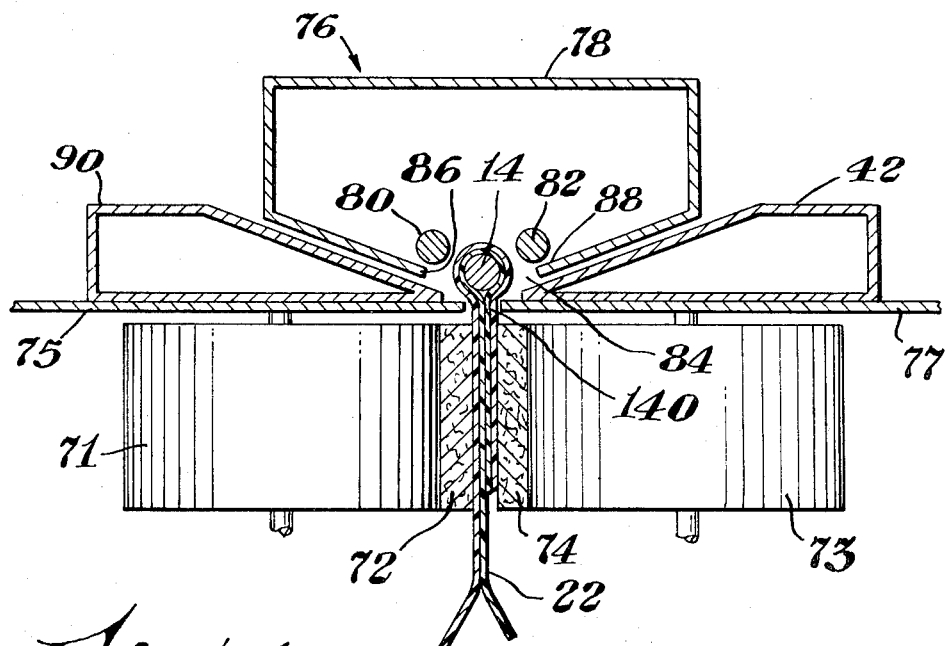
Figure 5:
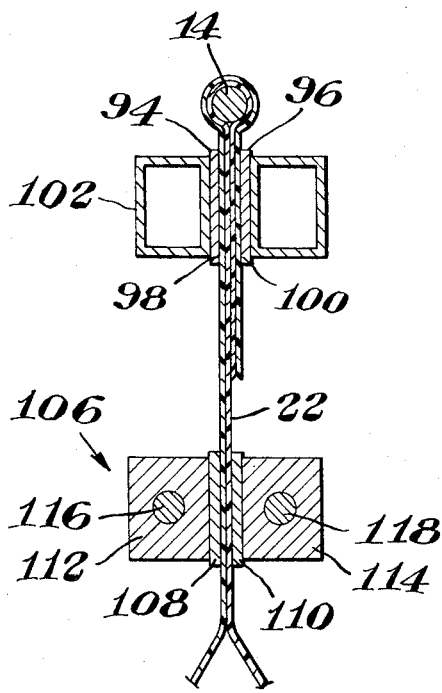

A stationary bag folding assembly 28 is cooperatively positioned immediately forward of trough 16 and comprises a bag folding tunnel 30, as is best viewed in FIG. 3. Carried centrally within folding tunnel 30 is an elongated guide 32 axially aligned with trough 16, and defining a guide channel 34 communicating with the channel portion 18 of the trough.

Figure 2:
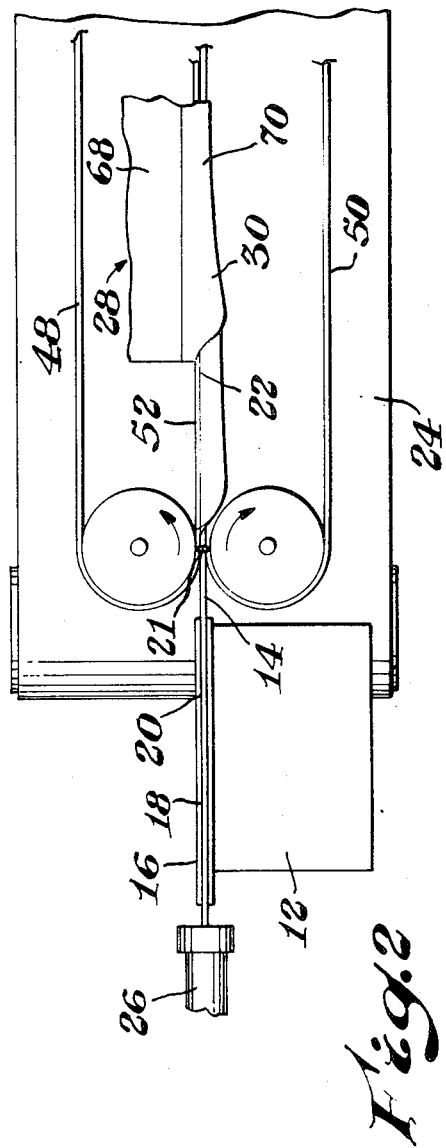
FIG. 2 is an enlarged partial top view of the apparatus of FIG. 1

Folding tunnel 30 can be formed of sheet metal, for example, and at its lower extremity 36 defines a vertical section 38 extending longitudinally in spaced parallel relationship with guide 32. A second vertical section 40 also preferably of sheet metal, serves as a stem supporting guide 30, and thus extends parallel section 38, but is separated therefrom by a continuous gap 42 which communicates with the interior of the folding tunnel. The upper extremity 44 of folding tunnel 30 begins as a slight clockwise-direction curl positioned over guide 32, as is best shown in FIG. 2; but the degree of curl gradually increases and is tapered downwardly. Thus, at mid-region portions of the folding tunnel 30 and backwardly therefrom, upper extremity 44 extends progressively further about guide 32 in radially spaced relationship therewith, but with the amount of such spacing gradually diminishing toward the back end of the folding tunnel.

A first pair of continuous gripping belts 48 and 50, including opposed inner runs 52 and 54 tightly squeezed together, such as by idler roller means 56 and 58, are operated horizontally at a level intermediate conveyor belt 24 and folding tunnel 30. The interface 60 defined between inner runs 52 and 54 communicates with gap 42 through the spacing 62 defined between a pair of rigid horizontal plates 64 and 66 to which roller means 56 and 58 are rotatably attached; and which further rigidly carry folding tunnel 30 and guide 32 via fixed attachment to vertical sections 38 and 40 at flanged regions 68 and 70.

Behind folding tunnel 30, belts 48 and 50 overlap for a short space distance, with a second pair horizontally operated gripping belts 72 and 74 which can be of like construction thereto, and which are placed at a level generally immediately above belts 48 and 50. Idler roller means 71 and 73 or the like tightly squeeze belts 72 and 74 together in a manner as before described with regard to belts 48 and 50, roller means 71 and 73 being rotatably attached such as to plate means 75 and 77 disposed upwardly thereof.

Above the central region of the second pair of gripping belts there is located a heating assembly 76 comprising a hollow housing 78 containing elongated resistant heating means or rods 80 and 82. The lowermost extent of housing 78 defines a continuous opening 84 located intermediate of heating rods 80 and 82, and which communicates longitudinally with gap 42.

Opposed water jackets 90 and 92 are located contiguous with the underside of the opposite edges 86 and 88 defining opening 84, and are fixedly held such as by attachment to plate means 75 and 77, respectively. The water jackets are maintained at a relatively cool temperature by circulating water through the hollow central regions thereof and act basically as a protective heat shield between heating rods 80 and 82 and belts 72 and 74.

A third set of horizontal belts 94 and 96 operate at a spaced distance behind housing 78, the inner runs 98 and 100 of which continuously slide between a second set of opposed water jackets 102 and 104. Belts 94 and 96 comprise, for example, heat conductive material such as thin metal sheeting. Therefore, cooled water or a like cooling medium circulating in jackets 102 and 104 is able to quickly conduct heat away from the belts to maintain the interface region of the belts relatively cool. Spaced below belts 94 and 96 is a horizontally placed sealing device 106 comprising, for example, horizontally operated thin metal bands 108 and 110. Bands 108 and 110 are heated to sealing temperatures such as by sliding contact with stationary heating members 112 and 114 operated such as by internally carried cartridge heaters 116 and 118.

Referring now to FIGS. 6 and 7 there is shown separately bag 22 including the provision of a hand-size cutout 120 located adjacent the top end 122 of the bag. Cutout 120 is preferably precut in the bag before feeding the bag to apparatus 10, although the cutouts may be formed subsequently as will become evident hereinafter.

As an alternate embodiment several finger-size cutouts (not shown) might be used to provide a handle structure of equal carrying facility to that where single cutout 120 is employed. The remainder of the structure of bag 22 is merely exemplary including typically, for example, opposed walls or panels 124 and 126 closed along three of the four common edges 128, 130, and 132 thereof. The fourth edge 134 is left open to define a fill opening 136 through which product 138 is loaded into bag 22.

OPERATION

To operate apparatus 10, bag 22 is placed on conveyor 24 and the top end of the bag manually or automatically fed between the first pair of gripping belts 48 and 50. Belts 48 and 50 assisted by bottom conveyor 24 thereafter automatically forward the bag to folding tunnel 30 where the uppermost extent of the bag enters the tunnel through gap 42. As the bag 22 reaches and is approximately contiguous to a rod 14 in trough 16, plunger 20 is operated to forward the rod at speed approximating the speed of the moving bag. The leading edge of the rod and that of the bag thus enter tunnel 30 at approximately the same moment. Simultaneously the top end 122 of the bag is gradually folded over the moving rod by sliding contact with the gradually curled upper extent of tunnel 30. Rod 14, in turn, is carried centrally within the tunnel by sliding on guide 32. Thus, as the bag and rod emerge together from the rearward end of the tunnel, the film at the top edge of the bag is snugly folded over rod 14 and can serve to feed the rod without further assistance from plunger 20. The four ply or layers comprising the folded over portion are then gripped between the second pair of belts 72 and 74 at a level below the lower edge of the encapsulated rod 14; and the folded over portion above belts 72 and 74 enters housing 78 through gap 84. Heating rods 80 and 82 thereafter apply heat radiantly along the top end portion of the moving bag, including the region comprising a narrow strip 140 immediately underneath the encapsulated rod. The plastic, if oriented, shrinks more tightly about rod 14; and generally immediately upon emergence of the bag from the housing 78, the heat plastified film layers along strip 140 are cooled and squeezed together simultaneously between cooling belts 94 and 96. The four layers along strip 140 are thus cooled and pressure welded across the width of bag 22. A second weld is formed spaced downwardly from the first weld by band sealer 106.

The finished bag is shown in FIG. 7 wherein the rod is positioned at the upper extent of the bag and immediately below the rod at the mid-region of the bag is the hand-size cutout 120. Cutout 120 will normally be about half its original size as the fold preferably is made along dotted line 142 shown in FIG. 6. The first seal 144 immediately under the rod represents the seal formed at heating assembly 76 assisted by belts 94 and 96. The second seal 146 located in spaced relationship below seal 144 represents the seal formed by band sealer 106, and as may be noted, closes bag 22 at a level below cutout 120. If desired, seal 144 can be raised from its shown position, such as by raising band sealer 106, whereby seal 144 would reside in an area of bag 22 comprising four layers of material or the folded over portion thereof. This, in turn, would more securely retain the folded over portion of film about rod 14, as might be desirable for large bag sizes.

Lifting bag 22 through cutout 120 distributes the load generally uniformly across the top end 122 of the bag, resulting approximately in vertical tension lines indicating uniform load distribution. The prior art bag is shown in FIG. 8 wherein the load distribution is primarily at the center of the bag, thereby resulting in tension lines as generally depicted at 148 showing less than satisfactory load distribution.

While the invention has been described more particularly with regard to attaching the handle to bags individually, it is readily apparent that the method hereof is applicable to chain fed bag elements of a type such as are shown, for example, in copending application Ser. No. 727,505, filed May 8, 1968, now abandoned.

It is, moreover, readily apparent that in lieu of attaching handles of discrete length to each bag, a continuous flexible ribbon of thick plastic, for example, might be employed, such as for chain bag constructions, and later severed when the bags are eventually parted from each other. Even though such a plastic ribbon may not provide the degree of stiffness of wood or possibly stiff paper, depending somewhat on plastic formulation, the bag would benefit by the reinforcement provided such that heavy loads could oftentimes be carried without tearing the film in the region of the handle. Moreover, the plastic encapsulating the ribbon can be attached thereto such as by heat sealing to avoid any possibility, for example, of the handle or ribbon being "pulled out."

Moreover, it is apparent that the handle may be attached to bags as the same are being fabricated, such as from continuous web material. Additionally, while preferably the cutout is preformed, the cutout can alternatively be formed subsequent to attaching the stiffening member by punching out an area of film between seals 144 and 146.

Referring now to some specifics of the invention, folding tunnel 30 would optimally be of a length about one-half to two-thirds the width of bag 22 to permit the folded over portion of the film to more readily grasp rod 12 upon emergence of the bag and rod from tunnel 30. Belts 48 and 50, and 72 and 74 are known, and can be constructed of fabric or rubber, or combinations of laminated materials such as fabric and rubber. Suitable films for constructing bags 22 can be heat sealable thermoplastic films, such as polyethylene or polypropylene film. As is understandable, multi-ply films can be employed as well as other conventional packaging films.

While certain representative embodiments and details have been shown for the purpose of illustrating the invention, it will be apparent to those skilled in the art that various changes and modifications can be made therein without departing from the spirit and scope of the invention. For example, it is readily apparent that belts such as are shown at band sealer 106 can be positioned immediately behind tunnel 30 to secure the film about encapsulated rod 14 generally immediately upon emergence of bag 22 from the tunnel. If the bag material comprises heat shrinkable film, the bag thereafter can be directed into a housing, like housing 78, to tightly shrink the film about the rod. As yet another modification, for example, means can be provided such as spaced apart parallel bars extending from a region behind tunnel 30 through housing 78 (not shown) to support rod 14 as it is moving through apparatus 10. The film underneath rod 14 would thus be adapted to travel between such bars, while the bars cooperatively supported the rod adjacent the underside thereof. This would positively keep rod 14 at a constant horizontal level as it passes through housing 10, thereby preventing the rod from "drooping" due to the weakened heat plastified condition of the film immediately beneath the rod, or the film along strip 140. Such bars could be cooled, if necessary, by making the same hollow, and circulating water through the hollow central region thereof.

What is claimed is:

1. In a method of attaching an elongated handle means to flexible material, the method comprising the steps of:

a. moving said material and elongated handle means in a direction aligned generally with the major axis of said handle means, and with the handle means being juxtapositioned with an edge portion of said material but spaced inwardly therefrom, said edge portion extending generally in the direction of said movement;

b. while said material and handle means are moving forward, folding said edge portion along a fold line extending generally in the direction of said movement, and about said handle means to encapsulate said handle means in said folded over edge portion; and c. securing said edge portion to the underlying material in a region below said encapsulated handle means to affix said material about the encapsulated handle means.

2. The method of claim 1 wherein said material comprises heat shrinkable plastic, and said elongated handle means comprises a rod of discrete length, said method including the step of directing said material to means for applying heat to shrink the material selectively to more tightly fit the material about the elongated handle means.

3. The method of claim 1 including the step before step (a) of forming a hand holding aperture means aperture said edge portion, and wherein step (a) comprises folding said edge portion along a fold line extending across said aperture means.

4. The method of claim 3 wherein said material comprises a bag element having opposed panels comprising said edge portion and defining therebetween an opening, said method including the step before step (a) of filling said bag with product through said opening.

5. The method of claim 4 including the additional step of isolating said aperture means from said product by heat sealing said bag at a region between said product and said aperature means.

* * * * *